United States Patent [19]

Bonjour et al.

[11] Patent Number: 4,609,214

[45] Date of Patent: Sep. 2, 1986

[54] THERMALLY INSULATED FLUID TRANSPORT LINE

[75] Inventors: Eric L. Bonjour, Rueil Malmaison; Alain J. Rocaboy, Paris, both of France

[73] Assignee: Compagnie Francaise des Petroles, Paris, France

[21] Appl. No.: 678,150

[22] Filed: Dec. 4, 1984

[30] Foreign Application Priority Data

Jan. 9, 1984 [FR] France ................. 84 00200

[51] Int. Cl.$^4$ ............................................. F16L 11/12
[52] U.S. Cl. .......................................... 285/47; 285/53; 285/286
[58] Field of Search ............ 285/47, 48, 53, 49, 285/50, 138, 331, 286, DIG. 5; 138/149

[56] References Cited

U.S. PATENT DOCUMENTS

| | | | |
|---|---|---|---|
| 3,650,299 | 3/1972 | Seiler ................................ | 138/149 |
| 3,850,714 | 11/1974 | Adorjan ........................ | 285/47 X |
| 3,907,049 | 9/1975 | Baffas .............................. | 285/138 |
| 3,944,262 | 3/1976 | Stiner et al. ..................... | 285/53 |
| 4,045,057 | 8/1977 | Halter .............................. | 285/49 |

FOREIGN PATENT DOCUMENTS 115467 9/1979 Japan ................................. 285/47

*Primary Examiner*—Dave W. Arola
*Attorney, Agent, or Firm*—Sughrue, Mion, Zinn, Macpeak & Seas

[57] ABSTRACT

A fluid transport line comprising coaxial inner and outer metal pipes, the inner pipe of which is intended to transport a thermally insulated fluid, is formed by successive sections, the inner and outer pipe portions of which are connected by means of metal rings interposed between successive sections in junction zones. To reduce the effect of the thermal losses thus created, a closed chamber containing a thermally insulating medium is defined round each junction zone by a metal shell which is welded to the outer pipe portions of the successive sections.

5 Claims, 1 Drawing Figure

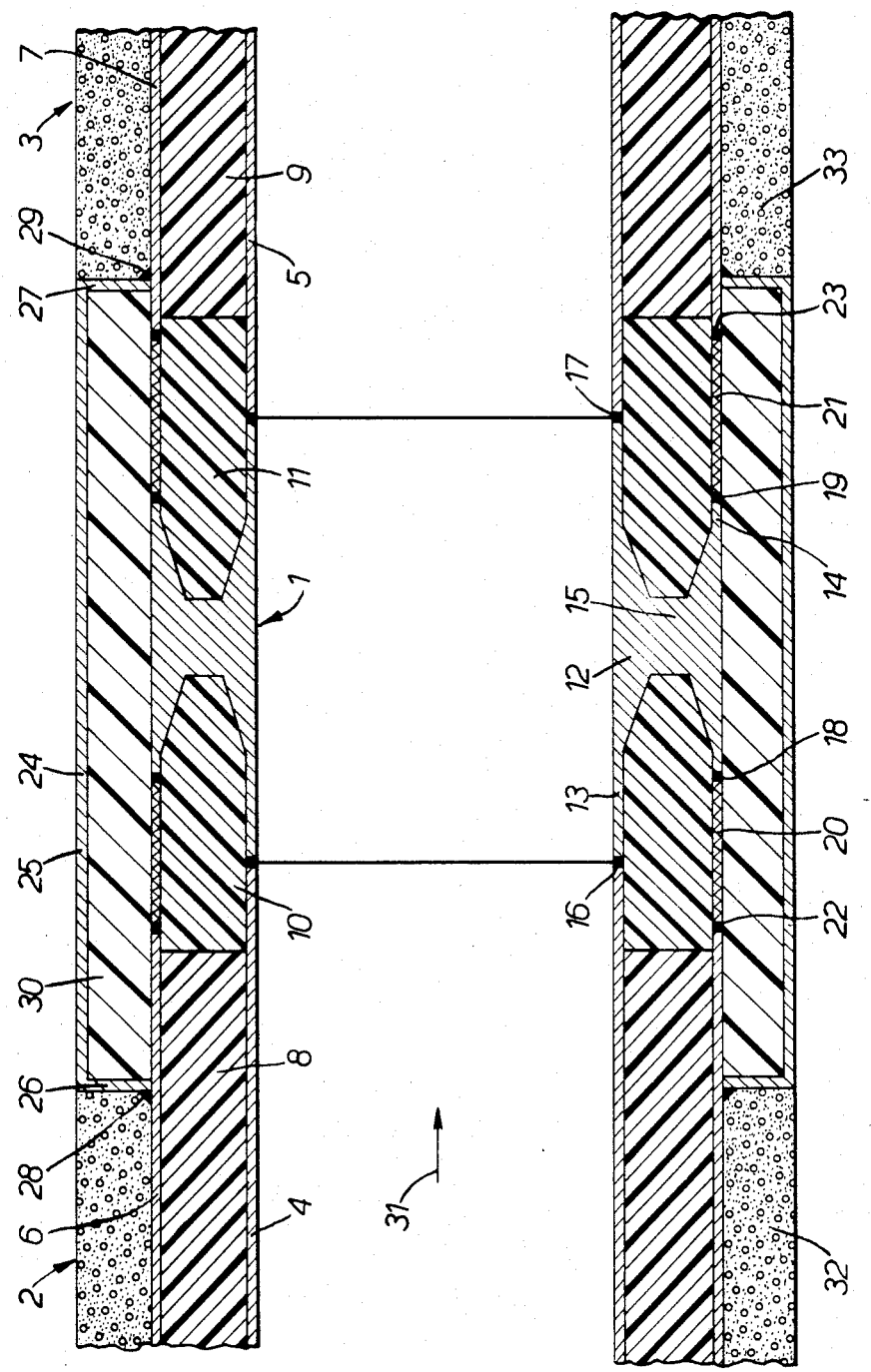

THERMALLY INSULATED FLUID TRANSPORT LINE

The invention relates to a fluid transport line with two coaxial metal pipes, one inner and the other outer, at least the inner pipe of which is used for transporting a cold or hot fluid which is to be thermally insulated relative to the outside of the line.

The annular space between the inner pipe and the outer pipe can be filled with an insulating material. It can also be used for transporting another fluid or for the circulation of a neutral gas for monitoring the leak-proofing of the line.

A difficult problem to solve involves the anchorage of the inner pipe in order to ensure that the inner pipe is centered and retained despite the very high mechanical stresses attributed to temperature differences, at the same time without giving rise to inadmissible heat losses. Particularly where a submerged line transporting a cryogenic fluid is concerned, poor local thermal insulation can result in the formation of ice on the outside of the line, thus increasing the buoyancy of the line and risking causing deformation and fracture of the line.

Studies conducted with a view to solving this problem have shown that it is not possible to ensure effective anchoring of the inner pipe by means of insulating components and that it is preferable, for anchoring the inner pipe in the outer pipe, to produce a localised thermal bridge between these two pipes from place to place along the line, but to limit the effects of these local thermal bridges by means of additional local insulation of the line.

According to the invention there is provided a fluid transport line comprising two coaxial metal pipes, an inner pipe and an outer pipe, the inner pipe being intended for transporting a fluid to be thermally insulated relative to the exterior of the line, and formed from a plurality of sections, each comprising an inner pipe portion and an outer portion, succeeding one another axially, the inner pipe portions and outer pipe portions of two successive sections being connected respectively to one another by means of welding in a junction zone with the interposition of a metal junction ring comprising an inner ferrule of the same diameter as the inner pipe, an outer ferrule of the same diameter as the outer pipe and a central annular part radially connecting the ferrules, and a metal shell arranged externally around the junction zone and terminating axially in end portions welded to the outer pipe portion of each of the two successive sections, so as to provide a closed chamber surrounding the junction zone which contains a thermally insulating medium.

The thermally insulating medium preferably comprises a foam of thermally insulating material, which may be a polyurethane or an epoxy foam.

In one embodiment, the metal shell has the form of a cylinder terminating axially at each end in a collar which is welded to the respective outer pipe portion of the two successive sections.

An embodiment of a fluid transport line according to the invention will now be described, by way of example only, with reference to the accompanying drawing.

In the drawing the single FIGURE is an axial section through an embodiment of a fluid transport line according to the invention.

The FIGURE shows a portion of a fluid transport line surrounding a junction zone 1 between two successive line sections 2 and 3.

The line section 2 comprises a portion 4 of a steel inner pipe of the line, and the line section 3 comprises another portion 5. Likewise, the line section 2 comprises a portion 6 of an outer steel pipe, the line section 3 comprising another portion 7. In the embodiment illustrated, the outer pipe serves merely as a sheath for the inner pipe and no fluid flows through the annular space between the inner pipe and the outer pipe. This annular space, designated by 8 in section 2 and by 9 in section 3, is filled by an injected polyurethane foam. The injected polyurethane foam does not extend to the junction zone 1. Two hoops 10, 11 moulded from polyurethane foam, introduced at the same time as a steel junction ring 12, as will be seen hereafter, complete the insulation between the inner pipe and the outer pipe.

The junction ring 12 forms an inner ferrule 13 and an outer ferrule 14 which are joined together by means of a central annular part 15. The inner ferrule 13, which is of greater axial length than the outer ferrule 14, is welded directly at its two axial ends 16, 17 to the inner pipe portions 4 and 5 respectively. The outer pipe portions 6 and 7 are cut shorter than the inner pipe portions 4 and 5, so that the ferrule 14 is not welded directly at its two axial ends 18, 19 to the outer pipe portions 6 and 7, but to lengths of steel tubing 20 and 21 inserted respectively between the pipe portion 6 and the ferrule 14 and between the pipe portion 7 and the ferrule 14. These lengths of tubing 20 and 21 are welded at their other axial ends 22, 23 to the outer pipe portions 6 and 7 respectively. This arrangement makes it possible to introduce the moulded hoops 10 and 11 after the welds of the ends 16 and 17 have been made and before the lengths of tubing 20 and 21 are put in place. In practice, the moulded hoops 10 and 11 are formed from two half-hoops which are bonded together after they have been put in place. Likewise, in practice, each of the lengths of tubing 20 and 21 is obtained from two lengths of half-tubing which are put in place and then welded to one another along two generating lines and at the ends to the adjacent components, namely the outer pipe portion 6 or 7 and the outer ferrule 14.

The junction zone 1 is surrounded on the outside by a steel shell 24 which is likewise formed from two half-shells which are put in place and welded to one another along two generating lines. The shell 24 comprises a cylindrical part 25 bordered at its axial ends by collars 26, 27 which are welded to the outer pipe portions 6 and 7 respectively by means of circular weld seams 28, 29. A hoop consisting of polyurethane foam, also formed from two half-hoops bonded together after being put in place, is installed inside the closed annular chamber 30 delimited by the shell 24 and the outer ferrule 14, the lengths of tubing 20, 21 and the end portions of the outer pipe portions 6 and 7.

Inside of the inner pipe which, in the region represented in the FIGURE, is formed by the pipe portions 4, 5 and the inner ferrule 13, a fluid, for example, petroleum gases liquefied at temperatures of the order of $-50°$ C., may flow in the direction of the arrow 31. The transport line is assumed to be submerged in water (not shown) and surrounded by an outer covering of concrete 32, 33 over its entire length on either side of the shells 24. The distance between junction zones 1 depends, in particular, on the profile of the line, on the requirements for centering of the inner pipe and on the admissible heat losses. It may be, for example, of the order of 50 to 100 meters. It may also be selected so that, in the event that water penetrates into a particular section, the increase in heat losses resulting from this for the line as a whole is still acceptable and it is thus possible to avoid the need to replace a single defective section.

The dimensions of the metal shells 24 and of the hoops of polyurethane foam filling the chambers 30 depend on the characteristics of each installation. By way of example, in a particular case of a submerged line comprising an inner pipe having an outside diameter of 50 cm and intended for transporting liquefied gases at $-50°$ C. and an outer pipe forming a sheath with an outside diameter of 66 cm, the metal shell 24 has a length of 2 m, a thickness of 2 cm and an inside diameter of 76 cm, contains a hoop of polyurethane foam with a thickness of 5 cm, the central part 15 of the junction ring 12 having an axial thickness of 4 cm in the narrowest place and of 20 cm at the connection with the ferrules 13 and 14.

When the inner pipe is refrigerated, the rings 12 undergo shearing stress, whilst the inner pipe is subjected to tension and the outer pipe to axial compression. The form of the rings 12 and more particularly of their central annular parts 15 is selected so as to avoid stress concentrations. The function of these rings 12 is to prevent displacements which are detrimental to the useful life of the various elements of the transport line. The shell 24 and the chamber 30 which it delimits are designed to reduce the effects of the thermal bridge produced by the corresponding ring 12 to a sufficient extent to prevent any risk of freezing of the water surrounding the line.

In a modification in which a fluid circulates in the annular space between the inner pipe and the outer pipe, the central annular part 15 of the ring 12 is perforated to allow the fluid to pass, and the annular spaces 8 and 9 would not be filled with foam.

What is claimed is:

1. A fluid transport line comprising an outer pipe (6, 7) and an inner pipe (4, 5) coaxial with outer pipe, said inner pipe being intended for transporting a fluid to be thermally insulated relative to the exterior of said line, said line being formed from a plurality of sections, each comprising an inner pipe portion and an outer pipe portion and succeeding one another axially, said inner pipe portions and said outer pipe portions of two successive sections being connected respectively to one another by a coupling means in a junction zone (1); said coupling means comprising:

a junction ring (12) comprising an inner ferrule (13) of the same inner and outer diameter as, and being sealably joined to, said inner pipe, and outer ferrule (14) of the same inner and outer diameter as, and being sealably joined to, said outer pipe and a central annular part (15) radially connecting said ferrules, a shell means (24) arranged externally around said junction zone and terminating axially in end portions (26, 27) sealably joined (28, 29) to said outer pipe portion of each of said two successive sections, so as to provide a closed chamber (30) surrounding said junction zone and a thermally insulating medium in said closed chamber.

2. A fluid transport line according to claim 1, wherein said shell has the form of a cylinder terminating axially at each end in a collar which is joined to the respective one of said outer pipe portions of said successive sections.

3. A fluid transport line according to claim 1, wherein said thermally insulating medium comprises a foam of thermally insulating material.

4. A fluid transport line according to claim 3, wherein said thermally insulating material is taken from the group comprising polyurethanes and epoxys.

5. A fluid transport line according to claim 1 wherein said outer pipe, said inner pipe, said junction ring and said shell means are made of metal and are sealably joined as recited by welding.

* * * * *